(12) United States Patent
Kehoe et al.

(10) Patent No.: US 11,473,510 B2
(45) Date of Patent: Oct. 18, 2022

(54) ACTIVE MULTI-EFFECTOR CONTROL OF HIGH PRESSURE TURBINE CLEARANCES

(71) Applicant: United Technologies Corporation, Farmington, CT (US)

(72) Inventors: Joseph Kehoe, Vernon, CT (US); Richard P. Meisner, Glastonbury, CT (US); Manuj Dhingra, Glastonbury, CT (US); Patrick D. Couture, Tolland, CT (US); Matthew R. Feulner, West Hartford, CT (US); Brenda J. Lisitano, Middletown, CT (US); Christopher L. Ho, Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 829 days.

(21) Appl. No.: 16/388,227

(22) Filed: Apr. 18, 2019

(65) Prior Publication Data

US 2020/0332726 A1    Oct. 22, 2020

(51) Int. Cl.
*F02C 9/54* (2006.01)
*F01D 11/24* (2006.01)
(Continued)

(52) U.S. Cl.
CPC ............... *F02C 9/54* (2013.01); *F01D 11/24* (2013.01); *F02C 9/20* (2013.01); *F01D 11/20* (2013.01); *F01D 11/22* (2013.01); *F05D 2270/04* (2013.01)

(58) Field of Classification Search
CPC .......... F01D 11/22; F01D 11/24; F01D 11/20; F01D 11/14; F02C 9/54; F02C 9/20; F02C 6/06; F05D 2270/04; F02K 3/075
See application file for complete search history.

(56) References Cited

U.S. PATENT DOCUMENTS

| | | |
|---|---|---|
| 4,257,222 A | 3/1981 | Schwarz |
| 4,795,307 A | 1/1989 | Liebl |

(Continued)

FOREIGN PATENT DOCUMENTS

GB    2057574 A    4/1981

OTHER PUBLICATIONS

European Search Report for European Application No. 20169684.6, dated Jul. 29, 2020, 9 pages.

*Primary Examiner* — Todd E Manahan
*Assistant Examiner* — Rene D Ford
(74) *Attorney, Agent, or Firm* — Cantor Colburn LLP

(57) ABSTRACT

A method of operating a gas turbine engine includes commanding an acceleration of the gas turbine engine and moving a variable pitch high pressure compressor vane toward an open position thereby reducing an acceleration rate of a high pressure turbine rotor thereby reducing a change in a clearance gap between the high pressure turbine rotor and a blade outer airseal. An active clearance control system of a gas turbine engine includes an engine control system configured to command an acceleration of the gas turbine engine and move a variable pitch high pressure compressor vane toward an open position thereby slowing an acceleration rate of a high pressure turbine rotor thereby reducing a change in a clearance gap between the high pressure turbine rotor and a blade outer airseal located radially outboard of the high pressure turbine rotor.

17 Claims, 4 Drawing Sheets

(51) Int. Cl.
   *F02C 9/20*    (2006.01)
   *F01D 11/20*   (2006.01)
   *F01D 11/22*   (2006.01)

(56) References Cited

U.S. PATENT DOCUMENTS

| | | |
|---|---|---|
| 5,165,844 A | 11/1992 | Khalid |
| 5,165,845 A | 11/1992 | Khalid |
| 6,155,038 A | 12/2000 | Irwin et al. |
| 6,164,902 A | 12/2000 | Irwin et al. |
| 6,758,044 B2 | 7/2004 | Mannarino |
| 7,597,537 B2* | 10/2009 | Bucaro .................. F01D 11/24 415/136 |
| 8,011,883 B2 | 9/2011 | Schwarz et al. |
| 8,126,628 B2 | 2/2012 | Hershey et al. |
| 9,097,133 B2 | 8/2015 | Dong et al. |
| 9,260,974 B2 | 2/2016 | Hasting et al. |
| 9,758,252 B2 | 9/2017 | Adibhatla et al. |
| 2001/0001845 A1 | 5/2001 | Khalid et al. |
| 2007/0084211 A1* | 4/2007 | Bowman ................ F02C 9/28 60/772 |
| 2009/0096174 A1* | 4/2009 | Spangler ............... F01D 11/08 277/345 |
| 2015/0378364 A1 | 12/2015 | Karpman et al. |
| 2018/0112550 A1 | 4/2018 | Dierksmeier et al. |

* cited by examiner

ACTIVE MULTI-EFFECTOR CONTROL OF HIGH PRESSURE TURBINE CLEARANCES

BACKGROUND

Exemplary embodiments of the present disclosure pertain to the art of gas turbine engines.

The active clearance control system on typical gas turbine engines allows for fuel burn and high pressure turbine (HPT) efficiency improvements and prolonged engine hot-section life. The current process utilizes a modulating butterfly valve that regulates bypass airflow around the circumference of the high pressure turbine case in order to reduce the clearances between the blades of the rotating turbomachinery and the outer air seals mounted in the stationary case. Due to the slow nature of the thermal transients through which the clearances are controlled, relative to the acceleration capabilities of the engine, there is a need to introduce an additional control mode in order to improve clearance control during engine transients. Being able to protect the engine from turbine rubs during the transient would allow the target clearance during cruise to be brought tighter, bringing more fuel burn and efficiency benefit.

The potential clearance pinch during an engine acceleration is largely a result of the centripetal growth of the blades, a mechanical phenomenon from the rate of high spool rotor speed (N2) acceleration.

BRIEF DESCRIPTION

In one embodiment, a method of operating a gas turbine engine includes commanding an acceleration of the gas turbine engine and moving a variable pitch high pressure compressor vane toward an open position thereby reducing an acceleration rate of a high pressure turbine rotor thereby reducing a change in a clearance gap between the high pressure turbine rotor and a blade outer airseal.

Additionally or alternatively, in this or other embodiments a portion of a turbofan bypass stream is directed to an outer circumference of a turbine case to control a thermal growth of a turbine case in which the blade outer airseal is located.

Additionally or alternatively, in this or other embodiments a rotational speed of a low pressure turbine is increased in response to the slowing of the acceleration rate of the high pressure turbine rotor, and a fuel flow to a combustor of the gas turbine engine is modulated to reduce an acceleration rate of the low pressure turbine.

Additionally or alternatively, in this or other embodiments modulating the fuel flow is reducing a rate of the fuel flow.

Additionally or alternatively, in this or other embodiments the reducing the acceleration rate of a high pressure turbine rotor prevents a rub condition between the blade outer airseal and the high pressure turbine rotor during the acceleration of the gas turbine engine.

In another embodiment, a gas turbine engine includes a turbine section having a high pressure turbine rotor having a plurality of rotor blades. A blade outer airseal is located radially outboard of the turbine rotor and defines a radial clearance gap between the plurality of rotor blades and the blade outer airseal. A compressor section includes a high pressure compressor rotor operably connected to the high pressure turbine via an outer shaft, and a high pressure compressor stator including a plurality of variable pitch stator vanes. An actuation system is operably connected to the plurality of variable pitch stator vanes configured to move the variable pitch stator vanes between a closed position and an open position. An engine control system is configured to command an acceleration of the gas turbine engine, and move a variable pitch high pressure compressor vane toward an open position thereby slowing an acceleration rate of a high pressure turbine rotor thereby reducing a change in a clearance gap between the high pressure turbine rotor and a blade outer airseal.

Additionally or alternatively, in this or other embodiments a low pressure turbine is located downstream of the high pressure turbine, and a combustor is located upstream of the high pressure turbine. The engine control system is additionally configured to modulate a fuel flow to the combustor in response to the slowing of the acceleration rate of the high pressure turbine rotor, thereby reducing an acceleration rate of the low pressure turbine.

Additionally or alternatively, in this or other embodiments modulating the fuel flow is reducing a rate of the fuel flow.

Additionally or alternatively, in this or other embodiments the low pressure turbine is secured to an inner shaft separate from the outer shaft.

Additionally or alternatively, in this or other embodiments the blade outer airseal is disposed in a high pressure turbine case.

Additionally or alternatively, in this or other embodiments reducing the acceleration rate of a high pressure turbine rotor prevents a rub condition between the blade outer airseal and the high pressure turbine rotor during the acceleration of the gas turbine engine.

Additionally or alternatively, in this or other embodiments the plurality of variable pitch stator vanes are rotatable about a vane axis to move between the open position and the closed position.

In yet another embodiment, an active clearance control system of a gas turbine engine includes an engine control system configured to command an acceleration of the gas turbine engine and move a variable pitch high pressure compressor vane toward an open position thereby slowing an acceleration rate of a high pressure turbine rotor thereby reducing a change in a clearance gap between the high pressure turbine rotor and a blade outer airseal located radially outboard of the high pressure turbine rotor.

Additionally or alternatively, in this or other embodiments the engine control system is additionally configured to modulate a fuel flow to a combustor of the gas turbine engine in response to the slowing of the acceleration rate of the high pressure turbine rotor, thereby reducing an acceleration rate of a low pressure turbine of the gas turbine engine.

Additionally or alternatively, in this or other embodiments modulating the fuel flow is reducing a rate of the fuel flow.

Additionally or alternatively, in this or other embodiments the reducing the acceleration rate of a high pressure turbine rotor prevents a rub condition between the blade outer airseal and the high pressure turbine rotor during the acceleration of the gas turbine engine.

Additionally or alternatively, in this or other embodiments the plurality of variable pitch stator vanes are rotatable about a vane axis to move between the open position and the closed position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
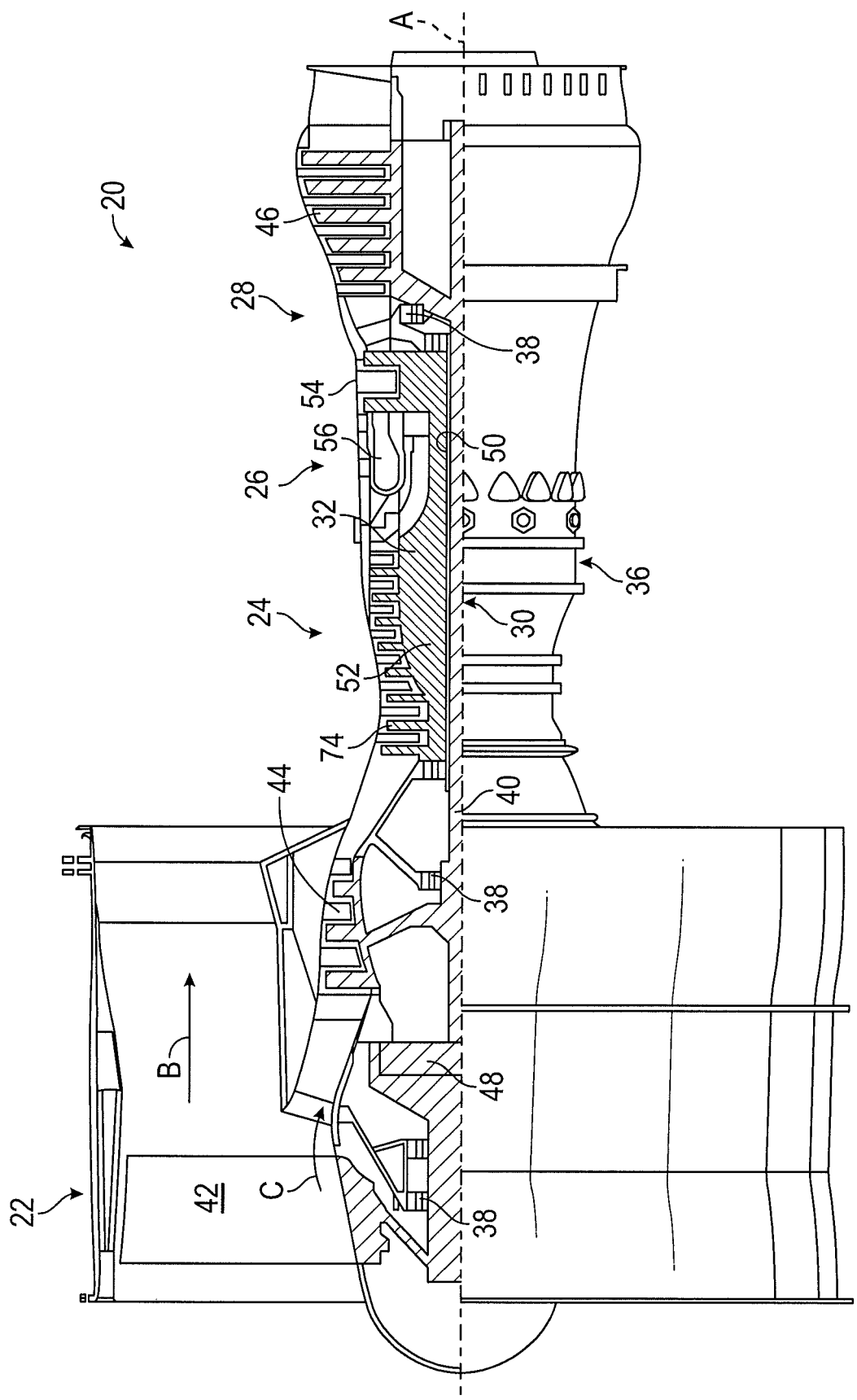
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
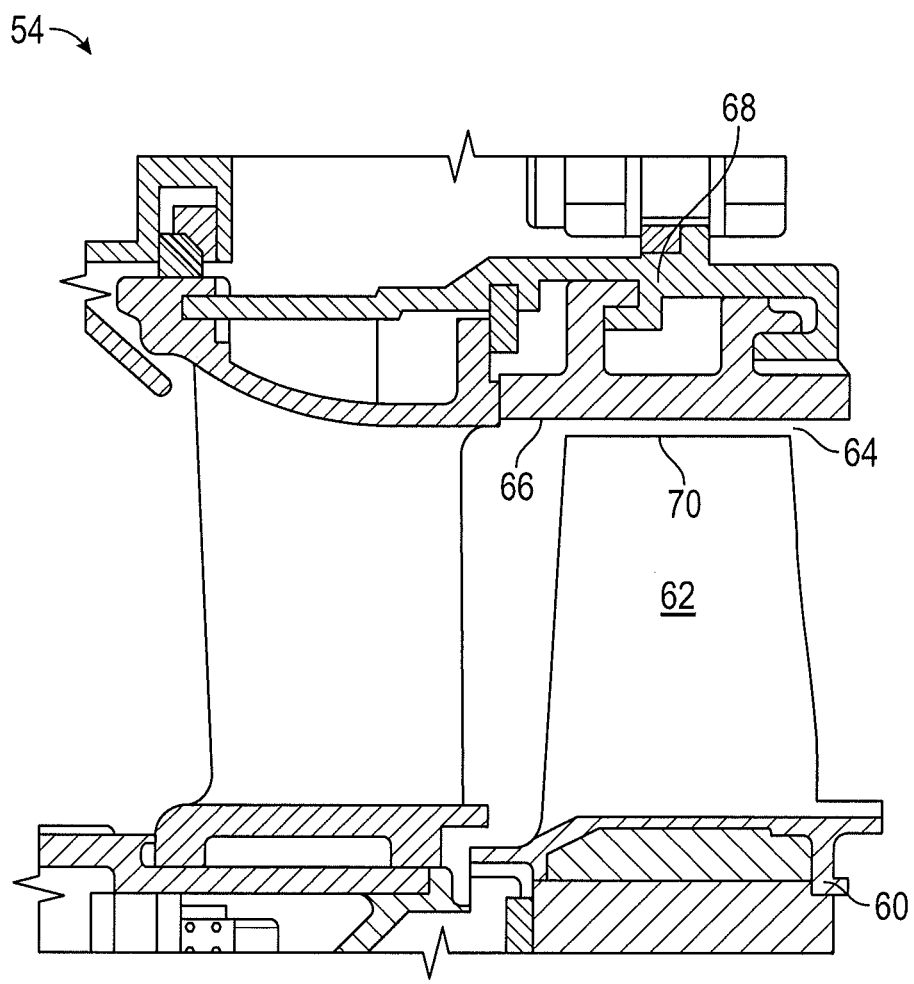
FIG. 2 is a partial cross-sectional view of an embodiment of a high pressure turbine.

Referring to FIG. 2, the high pressure turbine 54 includes one high pressure turbine rotors 60 having a plurality of turbine rotor blades 62. The high pressure turbine rotors 60 are configured to have a clearance gap 64 between a blade tip 70 and a blade outer airseal 66 secured to a rotationally fixed structure, for example, a high pressure turbine case 68, located radially outboard of the blade tip 70. It is desired to maintain as small a clearance gap 64 as possible throughout the engine 20 operating envelope, without the blade tips 70 contacting the blade outer airseal 66, a condition known as a "rub".

Figure 3:
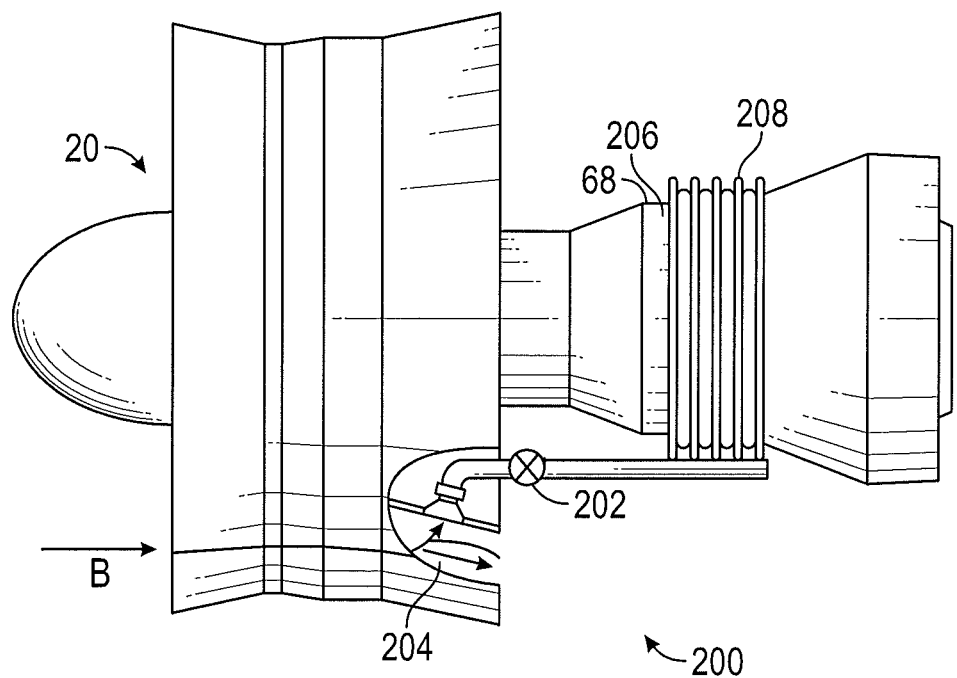
FIG. 3 is another partial cross-sectional view of an embodiment of a gas turbine engine.

Referring now to FIG. 3, the engine 20 includes an Active Clearance Control (ACC) system 200 to control the clearance gaps 64 between the blade tips 70 and the blade outer airseal 66. The ACC system 200 includes a valve 202, which in some embodiments is an electronically commanded, hydraulically actuated butterfly valve that directs airflow 204 from the turbofan bypass stream B to an outer circumference 206 of the high pressure turbine case 68 via one of more flow passages 208 extending around the outer circumference 206. The heat transfer effects of the relatively cool bypass airflow 204 convecting over the relatively hot high pressure turbine case 68 forces the case 68 to close in on the blade tips 70 (shown best in FIG. 2), resultantly reducing clearances 64 between the blade tips 70 and blade outer airseal 66. How tightly the clearance gaps 64 can be closed without contacting the blade tips 70 is limited by numerous exogenous factors, often which cannot be mitigated without hardware redesign. One exception is the clearance headroom to accommodate clearance pinch during a rapid acceleration (a "snap accel"). The dynamics of the centrifugal turbine rotor blade 62 growth are much faster than the thermal dynamics through which the clearances are controlled by the ACC system 200, causing clearance gaps 64 to temporarily tighten faster than the high pressure turbine case 68 can respond, and necessitates headroom in the clearance gap 64 target. While in some embodiments, a hydraulically actuated butterfly valve is utilized, embodiments of Active Clearance Control system 200 using other types of valves, and/or other means of actuation of the valves are contemplated within the scope of the present disclosure.

Figure 4:
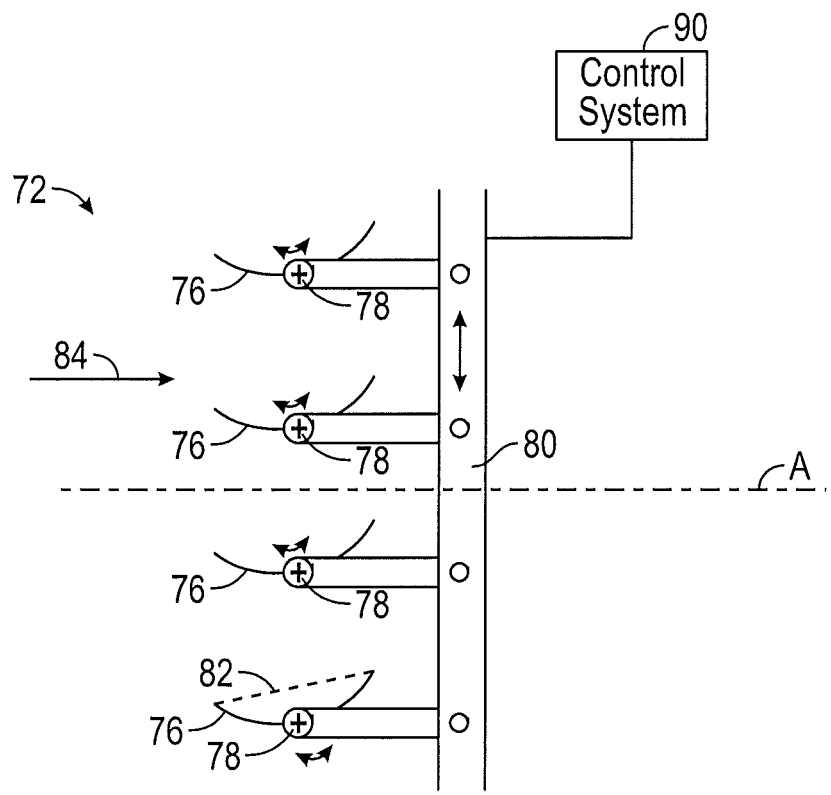
FIG. 4 is a partial plan view of an embodiment of a variable pitch high pressure compressor stator.

In the present disclosure, additional engine 20 effectors, in addition to the current bypass air flow modulating, to manage high pressure turbine rotors 60 acceleration rates for the purpose of active clearance control. More specifically, referring to FIG. 4, the high pressure compressor 52 includes one or more high pressure compressor stators 72 and one or more high pressure compressor rotors 74 (shown in FIG. 1). One or more of the HPC stators 72 are variable pitch stators. The high pressure compressor stators 72 include a plurality of stator vanes 76, which are selectably rotatable about their respective stator axes 78 by an actuation system 80. The stator vanes 76 are movable by the actuation system 80 between an "open" position and a "closed" position. Moving the stator vanes 76 toward the "open" position, as shown in FIG. 4, in which their chord lines 82 are closer to parallel to the direction of core airflow 84 through the high pressure compressor 52 reduces the rotational speed of the high pressure turbine rotor 60 via the outer shaft 50 connection between the high pressure turbine rotor 60 and the high pressure compressor rotor 74. Similarly, moving the stator vanes 76 toward the "closed" position, in which their chord lines 80 are closer to parallel to the direction of core airflow 82 through the high pressure compressor 52 increases the rotational speed of the high pressure turbine rotor 60.

Decreasing the rotational speed of the high pressure turbine rotor 60 reduces the clearance "pinch" or rate of reduction of the clearance gap 64 at the blade tip 70 and the blade outer airseal 66. Such reduces the occurrence of a rub condition between the blade tip 70 and the blade outer airseal 66.

To compensate for the reduction in rotational acceleration of the high pressure turbine rotor 60, also referred to N2, the rotational acceleration of the inner shaft 40 driven by the low pressure turbine 46, also referred to as N1, is increased.

Consequently, a fuel flow rate to the combustor section 26 is modulated via biasing one of the limits that the on-board constrained model-based multivariable control respects. Reduction of the fuel flow rate reduces the N1 acceleration rate. Such fuel flow modulation abates the N1 acceleration rate in order to preserve a nominal response and reduce a turbine clearance rub risk in the Low-Pressure Turbine (LPT) 46 from the analogous problem of centrifugal blade growth.

Figure 5:
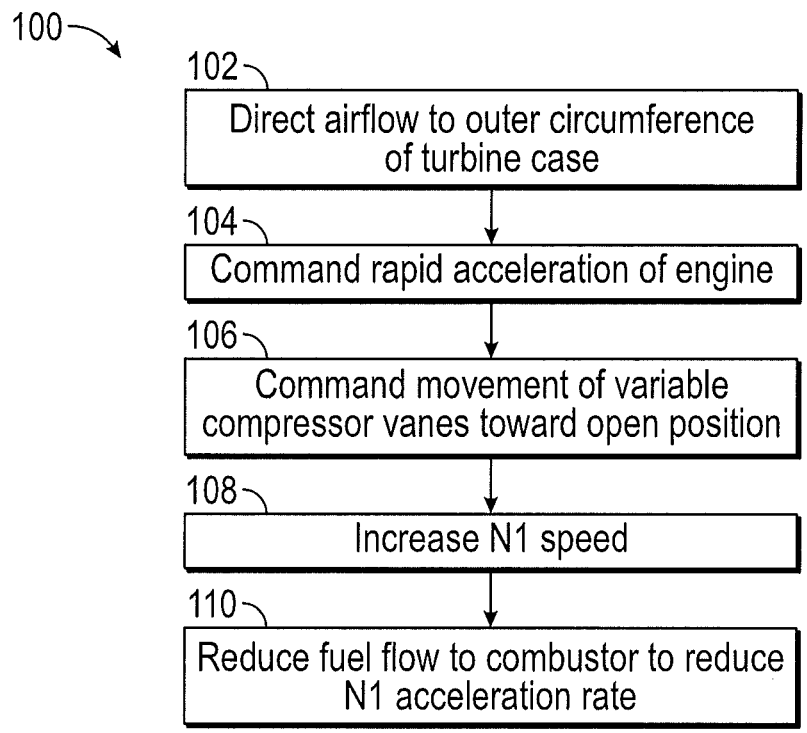
FIG. 5 is a schematic illustration of a method of operating a gas turbine engine.

Referring to FIG. 5, illustrated is a schematic of a method of active clearance control 100. In block 102, under normal operating conditions a butterfly valve directs air from the turbofan bypass stream B to the outer circumference of the high pressure turbine case 68. In block 104, an engine control system 90 commands a rapid or "snap" acceleration of the engine 20, causing acceleration of the high pressure turbine rotor 60. In block 106, the engine control system commands movement of the variable high pressure compressor stator vanes 76 toward the open position, thereby reducing an acceleration rate of the high pressure turbine rotor 60. The reduction of the acceleration rate reduces the risk of a rub between the blade tips 70 and the blade outer airseal 66. In block 108, since the rate of acceleration of the high pressure turbine rotor 60 is reduced, the acceleration rate of N1 increases. In block 110, a fuel flow to the combustor 26 is modulated to reduce an N1 acceleration rate.

The clearance gap 64 to which the engine 20 control to set to achieve is determined based on the smallest cruise, steady-state clearance gap 64 that would not permit a rub given an aggressive command engine acceleration. With the use of this new control mode, the clearance pinch during that acceleration is less in magnitude. This directly allows the entire steady-state target to be lower by the amount by which the pinch was reduced. Said differently, there is a current sub-optimal steady-state clearance that is held for a majority of a typical commercial mission as a precaution for a potential sharp increase in engine power while at cruise that may not occur.

Having implemented this control functionality, the benefit that is accrued is over the duration of the cruise segment of a typical mission being that clearances can be run more closely to optimal levels. As mentioned, the tighter the clearances can be held, the benefits can be felt in fuel burn and hot section refurbishment interval.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a gas turbine engine, comprising:
commanding an acceleration of the gas turbine engine;
accelerating a high pressure turbine rotor as a result of the command; and
moving a variable pitch high pressure compressor vane toward an open position after accelerating the high pressure turbine rotor, thereby reducing an acceleration rate of the high pressure turbine rotor thereby reducing a change in a clearance gap between the high pressure turbine rotor and a blade outer airseal.

2. The method of claim 1, further comprising:
directing a portion of a turbofan bypass stream to an outer circumference of a turbine case to control a thermal growth of a turbine case in which the blade outer airseal is located.

3. The method of claim 1, further comprising:
increasing a rotational speed of a low pressure turbine in response to the slowing of the acceleration rate of the high pressure turbine rotor; and
modulating a fuel flow to a combustor of the gas turbine engine to reduce an acceleration rate of the low pressure turbine.

4. The method of claim 3, wherein modulating the fuel flow is reducing a rate of the fuel flow.

5. The method of claim 1, wherein the reducing the acceleration rate of the high pressure turbine rotor prevents a rub condition between the blade outer airseal and the high pressure turbine rotor during the acceleration of the gas turbine engine.

6. A gas turbine engine, comprising:
a turbine section including:
a high pressure turbine rotor having a plurality of rotor blades;
a blade outer airseal disposed radially outboard of the turbine rotor and defining a radial clearance gap between the plurality of rotor blades and the blade outer airseal;
a compressor section including:
a high pressure compressor rotor operably connected to the high pressure turbine rotor via an outer shaft;
a high pressure compressor stator including a plurality of variable pitch stator vanes;
an actuation system operably connected to the plurality of variable pitch stator vanes configured to move the variable pitch stator vanes between a closed position and an open position; and
an engine control system configured to:
command an acceleration of the gas turbine engine;
cause acceleration of the high pressure turbine rotor based on the command; and
move a variable pitch high pressure compressor vane of the plurality of variable pitch stator vanes toward an open position after the acceleration of the high pressure turbine rotor, thereby slowing an acceleration rate of the high pressure turbine rotor thereby reducing a change in the clearance gap between the high pressure turbine rotor and a blade outer airseal.

7. The gas turbine engine of claim 6, further comprising:
a low pressure turbine disposed downstream of the high pressure turbine rotor; and
a combustor disposed upstream of the high pressure turbine;
wherein the engine control system is additionally configured to modulate a fuel flow to the combustor in response to the slowing of the acceleration rate of the high pressure turbine rotor, thereby reducing an acceleration rate of the low pressure turbine.

8. The gas turbine engine of claim 7, wherein modulating the fuel flow is reducing a rate of the fuel flow.

9. The gas turbine engine of claim 7, wherein the low pressure turbine is secured to an inner shaft separate from the outer shaft.

10. The gas turbine engine of claim 6, wherein the blade outer airseal is disposed in a high pressure turbine case.

11. The gas turbine engine of claim 6, wherein the reducing the acceleration rate of a high pressure turbine rotor prevents a rub condition between the blade outer airseal and the high pressure turbine rotor during the acceleration of the gas turbine engine.

12. The gas turbine engine of claim 6, wherein each of the plurality of variable pitch stator vanes is rotatable about a respective vane axis to move between the open position and the closed position.

13. An active clearance control system of a gas turbine engine, comprises an engine control system configured to:
command an acceleration of the gas turbine engine;
cause acceleration of a high pressure turbine rotor based on the command; and
move a variable pitch high pressure compressor vane toward an open position after the acceleration of the high pressure turbine rotor, thereby slowing an acceleration rate of the high pressure turbine rotor thereby reducing a change in a clearance gap between the high pressure turbine rotor and a blade outer airseal disposed radially outboard of the high pressure turbine rotor.

14. The active clearance control system of claim 13, wherein the engine control system is additionally configured to modulate a fuel flow to a combustor of the gas turbine engine in response to the slowing of the acceleration rate of the high pressure turbine rotor, thereby reducing an acceleration rate of a low pressure turbine of the gas turbine engine.

15. The active clearance control system of claim 14, wherein modulating the fuel flow is reducing a rate of the fuel flow.

16. The active clearance control system of claim 13, wherein the reducing the acceleration rate of a high pressure turbine rotor prevents a rub condition between the blade outer airseal and the high pressure turbine rotor during the acceleration of the gas turbine engine.

17. The active clearance control system of claim 14, wherein each of the plurality of variable pitch stator vanes is rotatable about a respective vane axis to move between the open position and the closed position.

* * * * *